United States Patent [19]
Borrel et al.

[11] Patent Number: 5,764,217
[45] Date of Patent: Jun. 9, 1998

[54] SCHEMATIC GUIDED CONTROL OF THE VIEW POINT OF A GRAPHICS PROCESSING AND DISPLAY SYSTEM

[75] Inventors: Paul Borrel, Peekskill; Peter Daniel Kirchner, Putnam Valley; James Sargent Lipscomb, Yorktown Heights; Jai Prakash Menon, Peekskill; Jaroslaw Roman Rossignac, Ossining; Robert Howard Wolfe, Yorktown Heights, all of N.Y.

[73] Assignee: International Business Machines Corporation, Armonk, N.Y.

[21] Appl. No.: 716,668

[22] Filed: Sep. 10, 1996

Related U.S. Application Data

[63] Continuation of Ser. No. 376,582, Jan. 23, 1995, abandoned.
[51] Int. Cl.$^6$ .............................. G09G 5/00; G06F 3/033
[52] U.S. Cl. .......................... 345/156; 345/139; 345/158
[58] Field of Search ..................................... 345/156–158, 345/6–9, 126, 139, 420, 425, 427, 437, 438; 395/120, 125, 127, 137, 138

[56] References Cited

U.S. PATENT DOCUMENTS

| | | | |
|---|---|---|---|
| 5,040,055 | 8/1991 | Smith | 358/87 |
| 5,045,843 | 9/1991 | Hansen | 345/158 |
| 5,177,872 | 1/1993 | Lewis et al. | 33/366 |
| 5,200,818 | 4/1993 | Neta et al. | 358/87 |
| 5,227,985 | 7/1993 | DeMenthon | 345/158 |
| 5,237,647 | 8/1993 | Roberts et al. | 395/119 |
| 5,287,437 | 2/1994 | Deering | 395/127 |
| 5,293,529 | 3/1994 | Yoshimura et al. | 345/158 |
| 5,296,871 | 3/1994 | Paley | 345/163 |
| 5,297,061 | 3/1994 | Dementhon et al. | 364/559 |
| 5,329,276 | 7/1994 | HIrabayashi | 340/870.31 |
| 5,353,042 | 10/1994 | Klapman et al. | 345/156 |
| 5,388,990 | 2/1995 | Beckman | 345/8 |
| 5,424,556 | 6/1995 | Symosek et al. | 345/8 |
| 5,436,638 | 7/1995 | Bolas et al. | 345/156 |

OTHER PUBLICATIONS

IBM Tech. Disc. Bulletin V.36 #3 Mar. 1993 D. T. Ling et al Fore–Screen Display and Manipulation for Virtual World Interaction pp. 45–46.
IEEE Computer Graphics & Applications V.14 #3 May 1994 pp. 12–15 "The Responsive Workbench" W. Krueger et al.

*Primary Examiner*—Jeffery Brier
*Attorney, Agent, or Firm*—Jay P. Sbrollini

[57] ABSTRACT

A graphics processing and display system includes a coordinate sensing system for determining position and orientation of a view point reference with respect to a schematic representation of at least one three-dimensional object; a view point controller for controlling a display view point according to the determined position and orientation of the view point reference with respect to the schematic representation; and a display processor for generating pixel data representing a two-dimensional rendering of the at least one three-dimensional object according to the graphics data and display view point, wherein the two-dimensional rendering is different from the schematic representation, and wherein the pixel data generated by the display processor is output for display on a display device. Advantageously, the system of the present invention is efficient and easier to use than prior art graphics processing and display systems because the user is provided the ability to control the display view point according to the position and orientation of the view point reference with respect to the schematic representation of the displayed object.

24 Claims, 11 Drawing Sheets

SCHEMATIC GUIDED CONTROL OF THE VIEW POINT OF A GRAPHICS PROCESSING AND DISPLAY SYSTEM

CROSS REFERENCE TO RELATED APPLICATIONS

This is a continuation of application Ser. No. 08/376,582, filed Jan. 23, 1995, now abandoned.

BACKGROUND OF THE INVENTION

1. Technical Field

The invention relates to graphics processing and display systems, and, more particularly, to controlling the view point of graphics processing and display systems.

2. Description of the Prior Art

Figure 1:
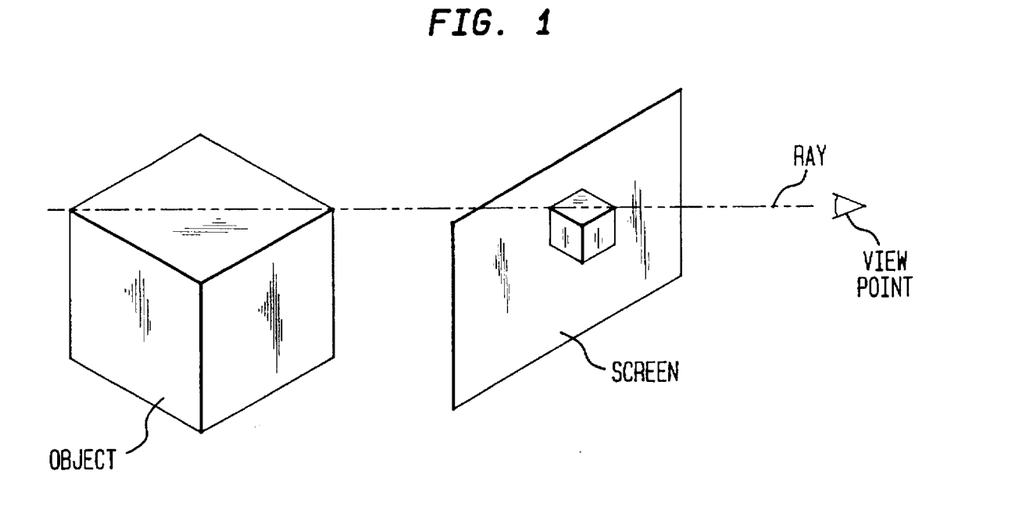
FIG. 1 is a pictorial representation of a method utilized by a graphics processing and display system to display a three-dimensional object on a two-dimensional screen.

Graphics processing and display systems store large amounts of data that represent three-dimensional objects and associated features. The data may be, for example, the position of each of the object's surfaces along a z-axis (depth), or color of each of the object's surfaces. The data is processed according to a view point that defines the visual point from which the object is to be displayed. As shown in FIG. 1, the view point corresponds to a position and orientation (direction) within the coordinate system of the object to be displayed, and is utilized to display the object on a two-dimensional screen by tracing a ray of light that passes from the view point through the screen.

Traditionally, the view point is set initially by the system and updated according to a user-input command. Typically, the user-input command is a predetermined key stroke or mouse click that is recognized by the system as a command to change the view point. However, this method is cumbersome, time consuming and difficult to learn when navigating through a scene that includes one or more detailed objects.

Recently, virtual reality environments have been developed wherein a user wearing sensor gloves and/or a bodysuit and a head mounted display can interact with displayed computer generated objects. In one such environment, as described in the article by D. T. Ling et al., *Fore-Screen Display and Manipulation for Virtual World Interaction*, IBM Technical Disclosure Bulletin, Vol. 36 No. 03, pp. 45–46, March 1993, computer generated objects are observed with a stereoscopic display and stereoscopic eyeglasses. The view point of the display is controlled according to the position of a sensor affixed to the stereoscopic glasses. In another environment, as described in the article by Krueger and Froehlich, *The Responsive Workbench*, IEEE Computer Graphics and Applications, Vol. 14 No. 3, pp. 12–15, May 1994, the computer generated objects are displayed within a head mounted display and also on the surface of a workbench. The view point of the displays is controlled according to the relative position of a sensor affixed to the head mounted display with respect to the workbench. However, these methods suffer from the limitations that controlling the view point with head motion has limited range and is cumbersome when navigating through a detailed scene.

SUMMARY OF THE INVENTION

The above-stated problems and related problems of the prior art are solved with the principles of the present invention, schematic guided control of the view point of a graphics processing and display system that is provided by: a schematic representation of at least one three-dimensional object; means for determining position and orientation of a view point reference with respect to the schematic representation; a view point controller for controlling a display view point according to the determined position and orientation of the view point reference with respect to the schematic representation; and a display processor for generating pixel data representing a two-dimensional rendering of the three-dimensional object(s) according to the graphics data and display view point, wherein the two-dimensional rendering is different from the schematic representation; and a display for displaying the pixel data generated by the display processor.

The means for determining position and orientation of the view point reference with respect to the schematic representation may be a coordinate sensing system that includes a source and sensor. The sensor may be packaged in a housing suitable for being held in one hand, wherein the housing includes the view point reference. In this case, the view point is varied by moving the housing and sensor assembly with respect to the schematic representation by hand motion.

Advantageously, the system of the present invention is efficient and easier to use than prior art graphics processing and display systems because the user is provided the ability to control the display view point according to the position and orientation of the view point reference with respect to the schematic representation of the displayed object.

DETAILED DESCRIPTION OF THE PREFERRED EMBODIMENTS

Figure 2:
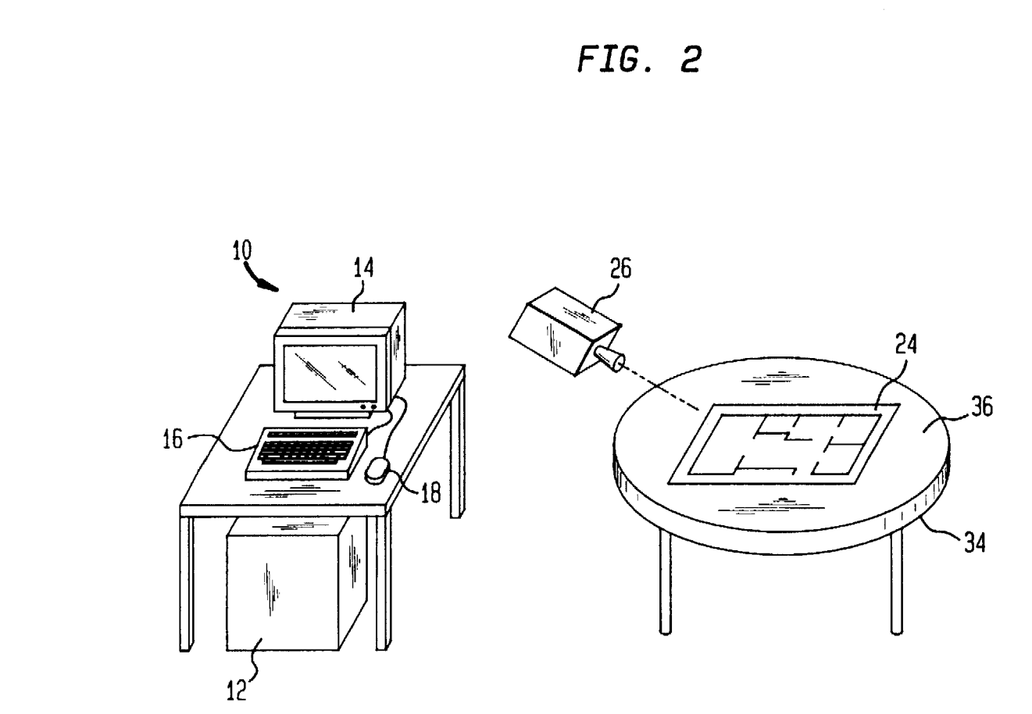
FIG. 2 is a top isometric view of a system for processing and displaying graphics data representing an object according to a view point in accordance with the present invention.

With reference to FIG. 2, there is shown a graphics processing and display system 10 in accordance with the present invention. The graphics processing and display system 10 typically includes a computer unit 12, a display unit 14, and one or more input devices such as a keyboard 16 and a pointing device 18, for example, a mouse, trackball or spaceball. The graphics processing and display system 10 may also include one or more large screen displays 20 such as projection screens or flat panel displays. The computer unit 12 includes memory and a storage device for storing graphics data representing one or more objects, and at least one processor for executing a display program. The objects may represent, for example, the three-dimensional view of a structure. The display program processes graphics data according to a view point. The processing of the display program may include hidden line removal or updating the size and location of the objects in a dynamic scene. The processed graphics data, or pixel data, is output to the display unit 14 and/or the large screen display unit 20 for display.

Figure 3:
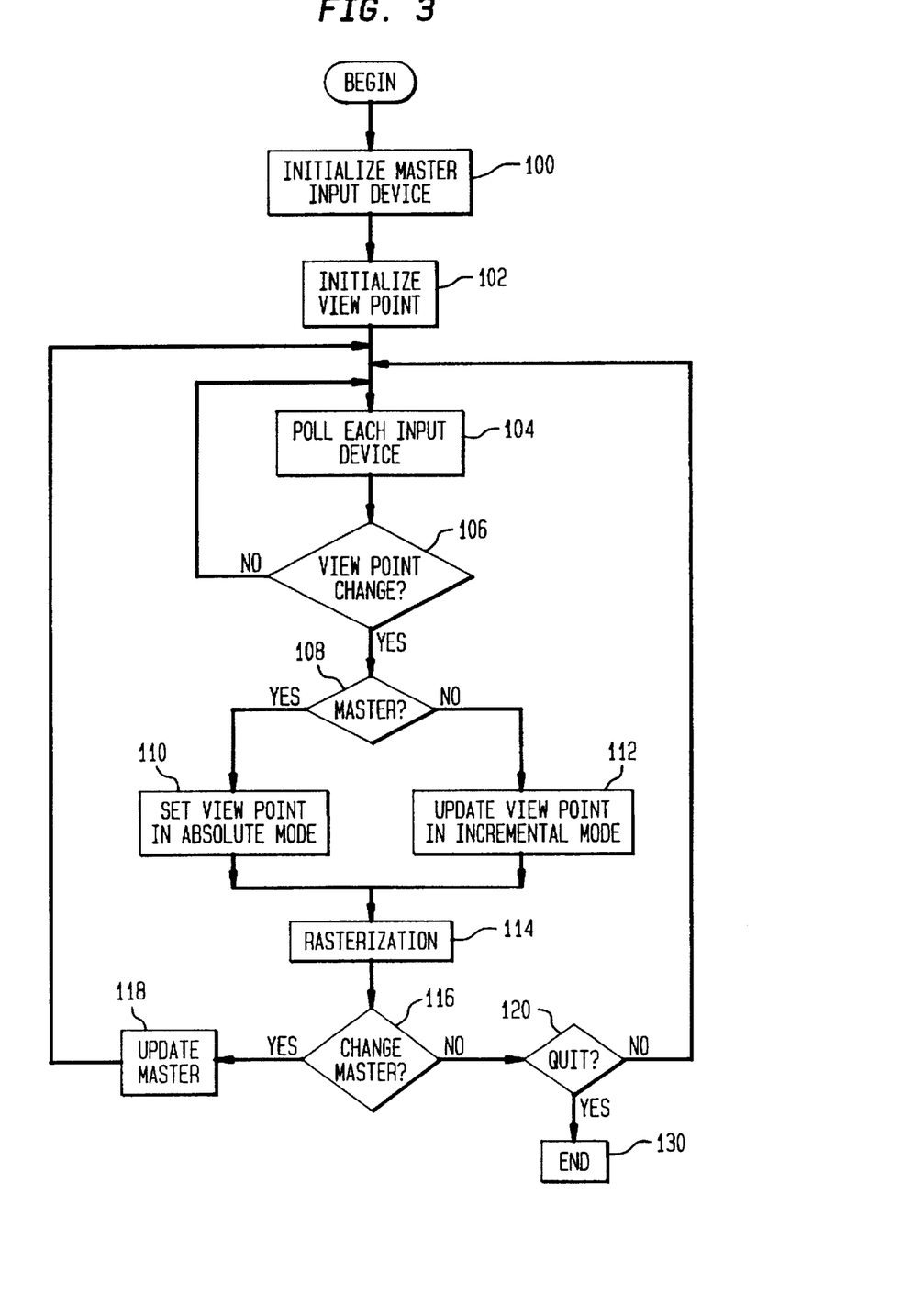
FIG. 3 is a flow chart of a view point control routine of a display program executed by the graphics processing and display system according to the present invention.

As shown in FIG. 3, the display program executed by the computer unit 12 includes a view point control routine that updates the view point according to commands input from a plurality of input devices, such as a keyboard or a pointing device such as a mouse, trackball or spaceball. The input devices can operate in one of two modes: master and slave. In master mode, the command of the input device to update the view point $VP_{new}$ operates as follows:

$VP_{new}=VP_i$, wherein $VP_i$ corresponds to the absolute view point input by the master device.

In slave mode, the command of the input device to update the view point $VP_{new}$ operates as follows:

$VP_{new}=f(VP_{old}, \Delta VP_i)$, wherein $VP_{old}$ corresponds to the currently stored view point, $\Delta VP_i$ corresponds to an incremental change in the currently stored view point input by the slave device.

The function f typically is a matrix multiplication operation.

In particular, the view point control routine of the display program begins in step 100 by initializing one of the input devices as a master and the other input devices as slaves, and in step 102 initializing the view point to a predetermined position and orientation. Each input device is then polled in step 104 to determine if the view point has changed. In step 106, if the view point output by one of the input devices has changed, flow continues to step 108 to determine if the device is the master. If the view point has not changed, flow returns back to step 104 to poll another one of the input devices. In step 108, if the device is the master, the view point is set to correspond to the absolute view point input by the master device in step 110. In step 108, if the device is a slave, the view point is set to correspond to the current view point incrementally changed according to the output of the slave device in step 112. After the view point has been updated in steps 110 and 112, flow continues to a rasterization routine 114 wherein the computer unit 12 processes the graphics data according to the updated view point to generate pixel data for display. Upon completion of the rasterization routine 114, flow continues to step 116 to determine if a command to change the mode assignments of the input devices (i.e., master and slave) has been received. If such a command has been received, in step 118 the mode assignments of the input devices are updated accordingly and flow returns back to step 104 to poll each of the input devices. If such a command has not been received in step 116, flow continues to step 120 to determine if the user has requested to quit the display program. If in step 120, it is determined that the user has not requested to quit, flow returns to step 104 to poll each of the input devices. If in step 120, it is determined that the user has requested to quit, flow continues to step 130 to end operation of the display program.

Figure 4:
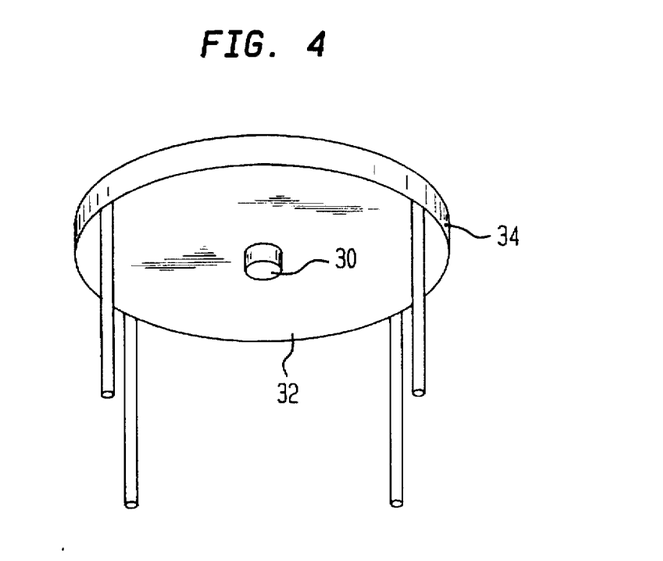
FIG. 4 is a bottom isometric view illustrating a source which is used in conjunction with the sensor of FIG. 1 according to a first embodiment of the present invention.

According to the present invention, one of the input devices that interfaces to the view point control routine is a coordinate sensing system, such as a 3SPACE® FASTRACK™ commercially available from Polhemus, Inc. As shown in FIGS. 2–5, the coordinate sensing system includes a source 30 for producing a three-dimensional electromagnetic field and a sensor 22 that intercepts the electromagnetic field produced by the source 30. The coordinate sensing system outputs a signal representing the position and orientation (six degrees of freedom) of the sensor 22 with respect to the source 30. The output signal of the coordinate sensing system is supplied to the computer unit 12 via a communication link, which may be a cable, an RF interface or an infra-red interface. As shown in FIG. 4, the source 30 may be affixed to a surface 32 of a table 34 upon which is disposed a schematic representation 24 of the object to be displayed. In this case, the source 30 has a fixed position and orientation with respect to the schematic representation 24. The schematic representation 24 need not replicate the geometric details of the object to be displayed, and may be a scaled representation of the object. Furthermore, the coordinate system of the schematic representation 24 corresponds to the coordinate system of the object to be displayed.

Figure 5:
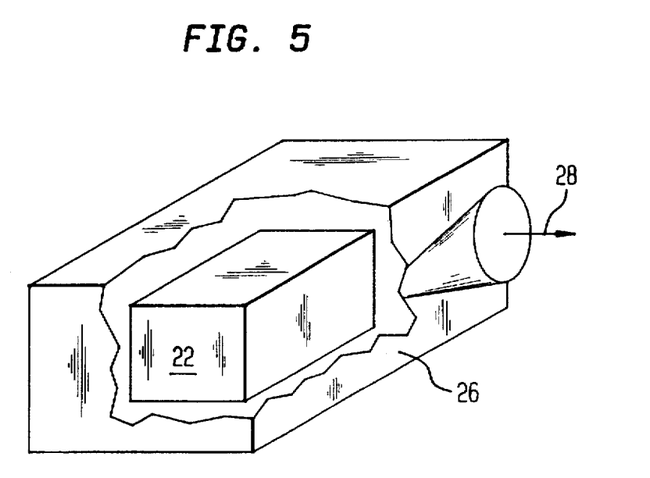
FIG. 5 is a partial cutaway view illustrating a sensor within a hand-held housing.

The sensor 22 may be packaged in a housing 26 suitable for being held in one hand. As shown in FIG. 5, the housing 26 may be, for example, in the shape of a hand-held miniature toy camera. The view point is controlled by moving the housing 26 with respect to the schematic representation 24 by hand motion. Moreover, a view point reference that has a fixed position and orientation with respect to the sensor 22 may be provided. As shown in FIG. 5, the view point reference may correspond to a position X on an imaginary/fictitious lens of the miniature camera with an orientation depicted by the unit normal vector 28.

As described above with respect to FIG. 3, the coordinate sensing system can operate in one of two modes: master and slave. When the coordinate sensing system is operating as a master, the view point control routine updates the view point to correspond to the current position and orientation of the view point reference with respect to the schematic representation 24.

Figure 6:
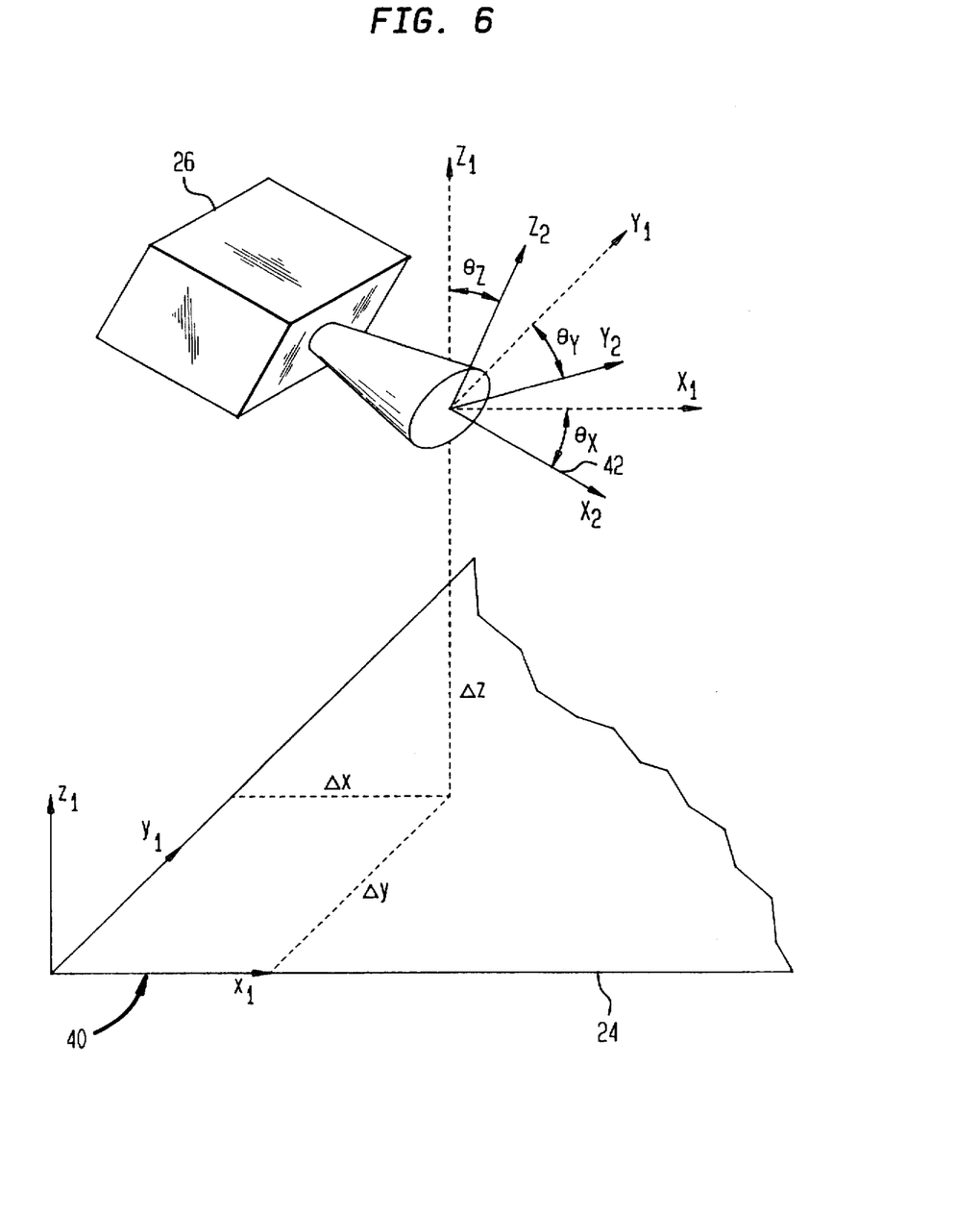
FIG. 6 depicts a transformation between the coordinate system of the schematic representation and the coordinate system of the view point reference that characterizes the position and orientation of the view point reference with respect to the schematic representation.

As illustrated in FIG. 6, the position and orientation of the view point reference with respect to the schematic representation 24 may be represented by a transformation between the coordinate system 40 of the schematic representation 24 depicted by the three orthogonal axes $X_1$, $Y_1$, and $Z_1$ and the coordinate system 42 of the view point reference depicted by the three orthogonal axes $X_2$, $Y_2$, and $Z_2$. For example, if the view point reference is defined as lying at the origin of the coordinate system 42, and the orientation of the view point reference is defined as being along the axis $X_2$, the position of the view point reference with respect to the schematic representation 24 may be defined by a transformation represented by three translational displacements $\Delta X$, $\Delta Y$, and $\Delta Z$. The orientation of the view point reference with respect to the schematic representation 24 may be defined by a transformation represented by the three rotational displacements $\theta_x$, $\theta_y$, and $\theta_z$.

Figure 7:
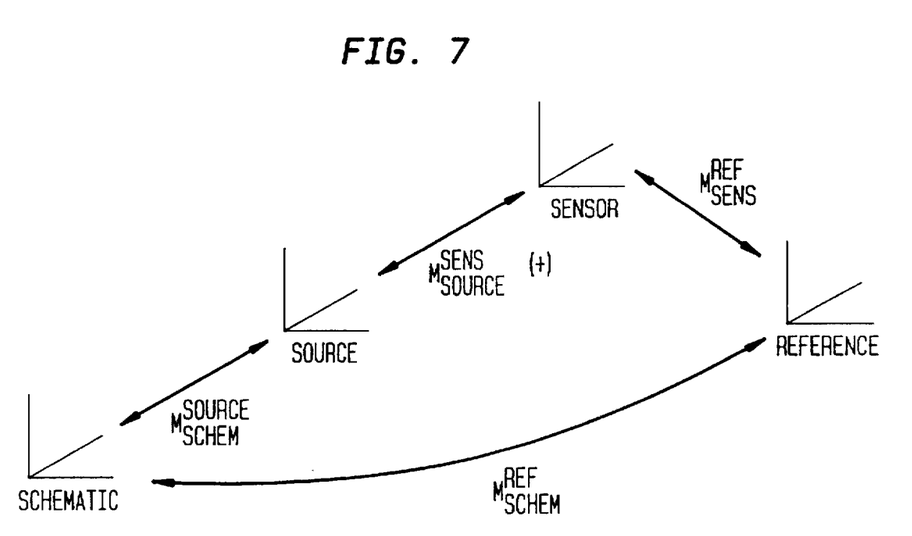
FIG. 7 is a pictorial representation of the coordinate system transformations utilized by the computer unit 12 of FIG. 2 to determine the position and orientation of a view point reference with respect to a schematic representation of the displayed objects in accordance with the first and second embodiments of the present invention.

As shown in FIG. 7, the transformation characterizing the position and orientation of the view point reference with respect to the schematic representation 24, denoted $M_{schem}^{ref}$, can be broken down into three parts. The first part, $M_{sens}^{ref}$, is a transformation representing the correspondence between the coordinate system of the view point reference 28 and the coordinate system of the sensor 22, and thus representing the fixed position and orientation of the view point reference with respect to the sensor 22. The second part, $M_{source}^{sens}(t)$, is a transformation representing the correspondence between the coordinate system of the sensor 22 and the coordinate system of the source 30, and thus representing the relative position and orientation of the sensor 22 with respect to the source 30 that is output by the coordinate sensing system over time. And the third part, $M_{schem}^{source}$, is a transformation that represents the correspondence between the coordinate system of the source 30 and the coordinate system of the schematic representation 24, and thus representing the fixed position and orientation of the source 30 with respect to the schematic representation 24. The first, second and third parts typically are four by four homogenous transformation matrices having a rotation portion, a translation portion and scale factors, if needed, as shown in Foley, Van Dam, Feiner and Hughes, Computer Graphics Principles and Practice, pp. 201–227, 1992, herein incorporated by reference. However, the invention is not limited in this respect. It is well known in the art that the correspondence between coordinate systems may be represented by a variety of mathematical techniques, such as using equations to define the correspondence between coordinate systems.

In particular, when the coordinate sensing system is operating in master mode, the view point control routine determines the current position and orientation of the view point reference with respect to the schematic representation 24 as follows. The first and third parts are typically determined and stored during calibration of the system, which is discussed in detail below. The second part is derived from the output of the coordinate sensing system. Finally, a sequence of transformations is performed according to the first, second and third parts.

For approximate view point control when the coordinate sensing system is operating as a master, the view point control routine may update the view point to correspond to the current position and orientation of the sensor 22 with respect to the schematic representation 24. In this case, the first part as described above is prescribed (or specified) from knowledge of the housing assembly, rather than being measured precisely during calibration.

The coordinate sensing system may also operate as a slave. In this case, the view point control program incrementally updates the view point to correspond to the relative change in the position and orientation of the sensor 22 with respect to the source 30 over time, denoted as $M_{source}^{sens}(t)$ in FIG. 7. In particular, the view point control routine determines the relative change in position and orientation of the sensor 22 with respect to the schematic representation 24 over time by first storing an initial position and orientation of the sensor 22 with respect to the schematic representation 24 output by the coordinate sensing system, and subsequently determining the change from the initial position and orientation over time according to the output of the coordinate sensing system.

According to a first embodiment of the present invention, the schematic representation 24 of the object to be displayed is incapable of displacement and/or rotation. For example, as shown in FIG. 2, the schematic representation 24 may be disposed on a surface 36 of the table 34 which is incapable of displacement and/or rotation. In this case, to achieve view point control over the entire schematic representation 24, it is required that the coordinate sensing system function properly over the entire representation 24. The 3SPACE® FASTRACK™ coordinate sensing system described-above meets these requirements. In particular, the source 30 of the 3SPACE® FASTRACK™ system is affixed to the bottom surface 32 of the table 34 as shown in FIG. 4.

In most cases, the system of the first embodiment provides an effective and user-friendly means for controlling the view point. However, a user may become confused when the view point reference 28 of the housing 26 is placed in an orientation facing the user. In this instance, moving the view point reference 28 to the left causes the display to shift to the right, and moving the view point reference 28 to the right causes the display to shift to the left. This problem is solved by second, third and fourth embodiments of the present invention.

Figure 8:
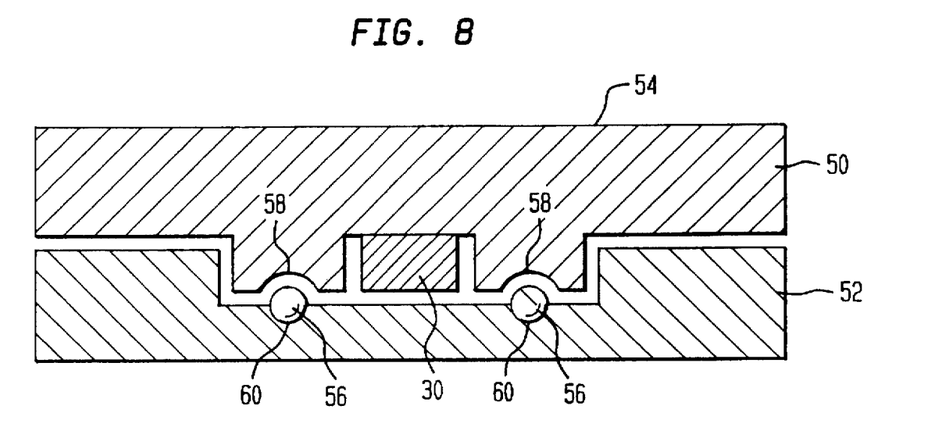
FIG. 8 is a cross-sectional view of the table of FIG. 1 according to a second embodiment of the present invention.
Figure 9:
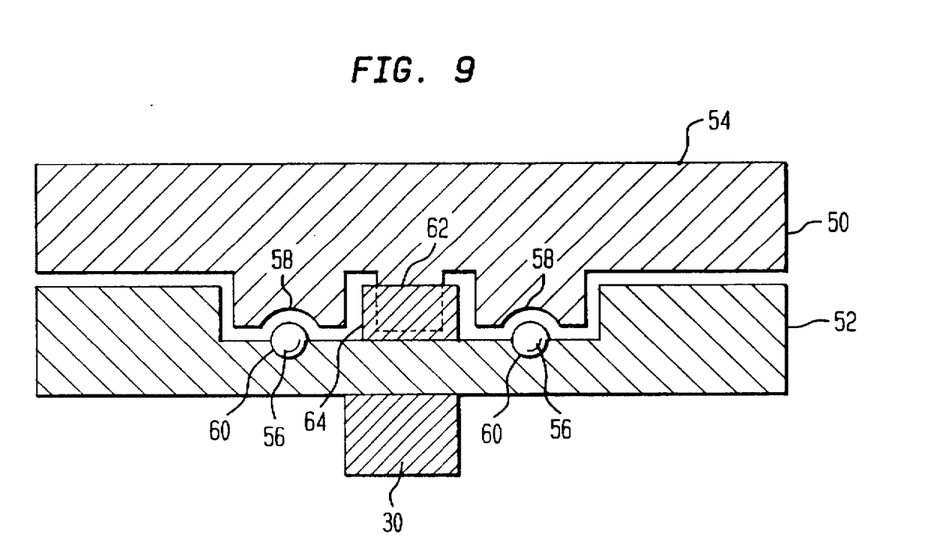
FIG. 9 is a cross-sectional view of the table of FIG. 1 according to a third embodiment of the present invention.

According to second and third embodiments of the present invention, the schematic representation 24 of the object to be displayed is provided with the capability of rotation. As shown in FIGS. 8 and 9, the table 34 includes a first portion 50 that is capable of rotation with respect to a stationary second portion 52. The schematic representation 24 is disposed on a surface 54 of the first portion 50. The displacement and/or rotation of the first portion 50 and the schematic representation 24 with respect to the second portion 52 may be provided by, for example, roller bearings 56 seated between a first groove 58 in the first portion 50 and a second groove 60 in the second portion 52. The roller bearings 56 may be conventional ball bearings or teflon bearings if ball bearings would interfere with the electromagnetics and/or electrostatics of the coordinate sensing system.

In the second embodiment as shown in FIG. 8, the source 30 of the coordinate sensing system is affixed to the first portion 50. In this case, it is required that the sensor 22 and the source 30 of the coordinate sensing system function properly when the source 30 is displaced and/or rotates with respect to the housing 26. The 3SPACE® FASTRACK™ coordinate sensing system described above meets these requirements. Other coordinate sensing systems may meet these requirements, such as those employing electrostatics to determine the relative position and orientation of the sensor 22 with respect to the source 30.

However, it may be desirable to implement less costly sensing systems that do not function properly when the source 30 rotates beyond certain limits with respect to the sensor 22. Such systems may use optical signals, infrared signals, ultrasound signals or other signaling methods to determine the position and orientation of the sensor 22 with respect to the source 30. One such system utilizing ultrasound signaling techniques is described in U.S. Pat. No. 5,287,437 to Deering. Typically, in order to operate properly, these systems require that the position and orientation of the sensor 22 with respect to the source 30 remain in a predetermined range of values. However, the first and second embodiments of the present invention may require these sensing systems to operate outside the predetermined range of values. Thus, employing these less costly sensing systems in the first and second embodiments as described above may be impractical.

The third embodiment of the present invention is directed to the utilization of these less costly coordinate sensing systems and at the same time accommodating a moving schematic representation 24. As shown in FIG. 9, the source 30 of the coordinate sensing system is affixed to the stationary second portion 52. Because the source 30 remains stationary, it is possible to utilize the less costly coordinate sensing systems. To achieve view point control over the entire schematic representation 24, the first portion 50 and second portion 52 include a device for determining the displacement and/or rotation of the first portion 50 with respect to the second portion 52. For example, FIG. 9 shows the first portion 50 having a rotating shaft 62 and an optical encoder 64 affixed to the second portion 52 for determining the displacement and/or rotation of the first portion 50 with respect to the second portion 52. The output signal of the optical encoder 64 is supplied to the computer unit 12 via a communication link, which may be a cable, an RF interface or an infra-red interface.

Figure 10:
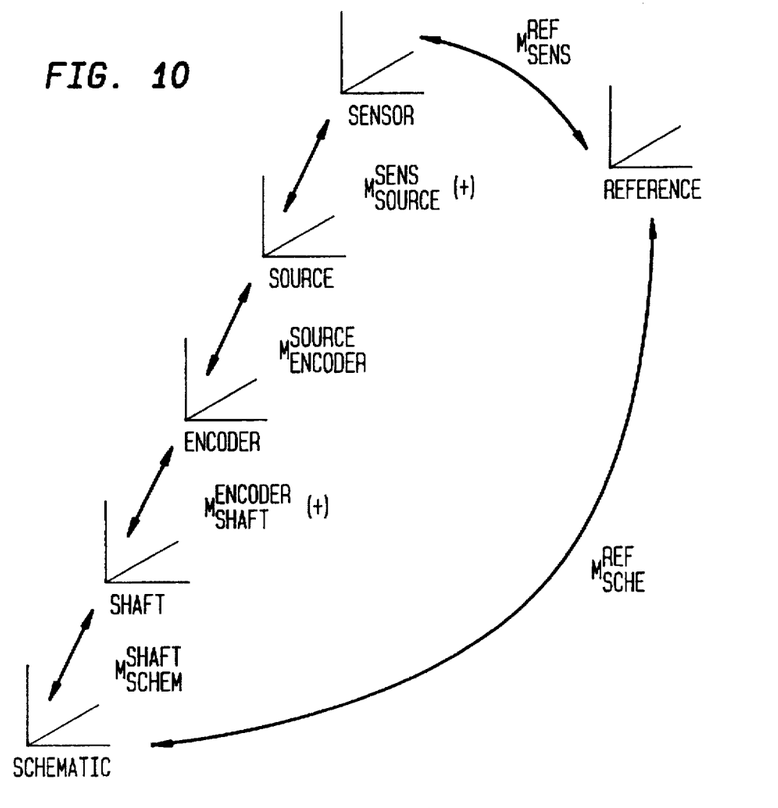
FIG. 10 is a pictorial representation of the coordinate system transformations utilized by the computer unit 12 of FIG. 2 to determine the position and orientation of a view point reference with respect to a schematic representation of the displayed objects in accordance with the third embodiment of the present invention.

In the system of FIG. 9, the transformation $M_{schem}^{ref}$ characterizing the position and orientation of the view point reference with respect to the schematic representation 24 may be broken down into five parts as shown in FIG. 10. The first part, $M_{sens}^{ref}$, is a transformation that represents the correspondence between the coordinate system of the view point reference 28 and the coordinate system of the sensor 22, and thus represents the fixed position and orientation of the view point reference 28 with respect to the sensor 22. The second part, $M_{source}^{sens}(t)$, is a transformation that represents the correspondence between the coordinate system of the sensor 22 and the coordinate system of the source 30, and thus represents the relative position and orientation of the sensor 22 with respect to the source 30 that is output by the coordinate sensing system over time. The third part, $M_{encoder}^{source}$, is a transformation that represents the correspondence between the coordinate system of the source 30 and the coordinate system of the encoder 64, and thus represents the fixed position and orientation of the source 30 with respect to the encoder 64. The fourth part, $M_{shaft}^{encoder}$ (t), is a transformation that represents the correspondence between the coordinate system of the encoder 64 and the coordinate system of the shaft 62, and thus represents the rotation of the shaft 62 with respect to the encoder 64 output by the optical encoder 64 over time. And the fifth part, $M_{schem}^{shaft}$, is a transformation that represents the correspondence between the coordinate system of the shaft 62 and the coordinate system of the schematic representation 24, and thus represents the fixed position and orientation of the shaft with respect to the schematic representation 24. The first, second, third and fifth parts typically are four by four homogenous transformation matrices having a rotation portion, a translation portion, and a scale portion if needed. The fourth part typically only has a rotation portion, i.e. the translation portion is zero.

In particular, the first, third and fifth parts are typically determined and stored during calibration of the system, which is discussed in detail below. The view point control routine determines the current position and orientation of the view point reference with respect to the schematic representation 24 by deriving the second part from the output of the coordinate sensing system, deriving the fourth part from the output of the optical encoder 64, and performing a sequence of transformations according to the first, second, third, fourth and fifth parts. However, the invention is not limited in this respect. It is well known in the art that the correspondence between coordinate systems may be represented by a variety of mathematical techniques, such as using equations to define the correspondence between coordinate systems.

Figure 11:
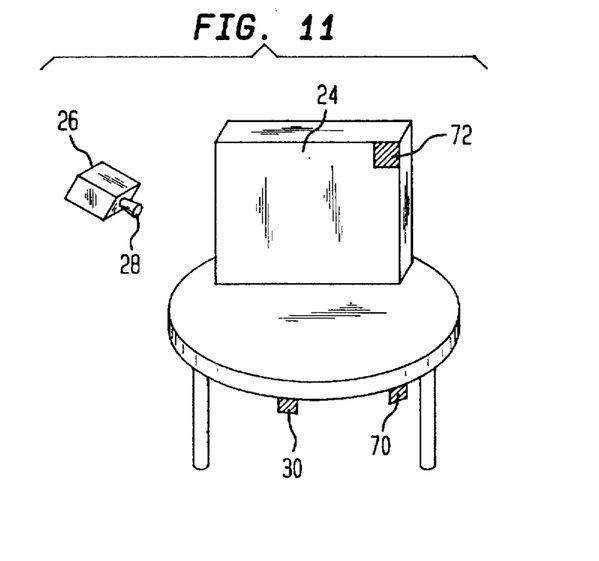
FIG. 11 is an elevational view of the table of FIG. 1 according to a fourth embodiment of the present invention.

The system illustrated in FIGS. 8 and 9 is limited in that the schematic representation 24 is restricted to rotational movement with respect to the source 30. According to a fourth embodiment of the present invention as shown in FIG. 11, the system is not limited in this respect in that the schematic representation 24 is capable of displacement with respect to the source 30. As shown, the system of the fourth embodiment includes a second coordinate sensing system, identical or similar to those described above with respect to the first embodiment, that determines the position and orientation of the schematic representation 24 with respect to a second source 70. The second coordinate sensing system, for example, may be a 3SPACE® FASTRACK™ System. In this case, the sensor 72 of the 3SPACE® FASTRACK™ system is affixed to a surface of the schematic representation 24 such that it remains in a fixed position and orientation with respect to the schematic representation 24.

Figure 12:
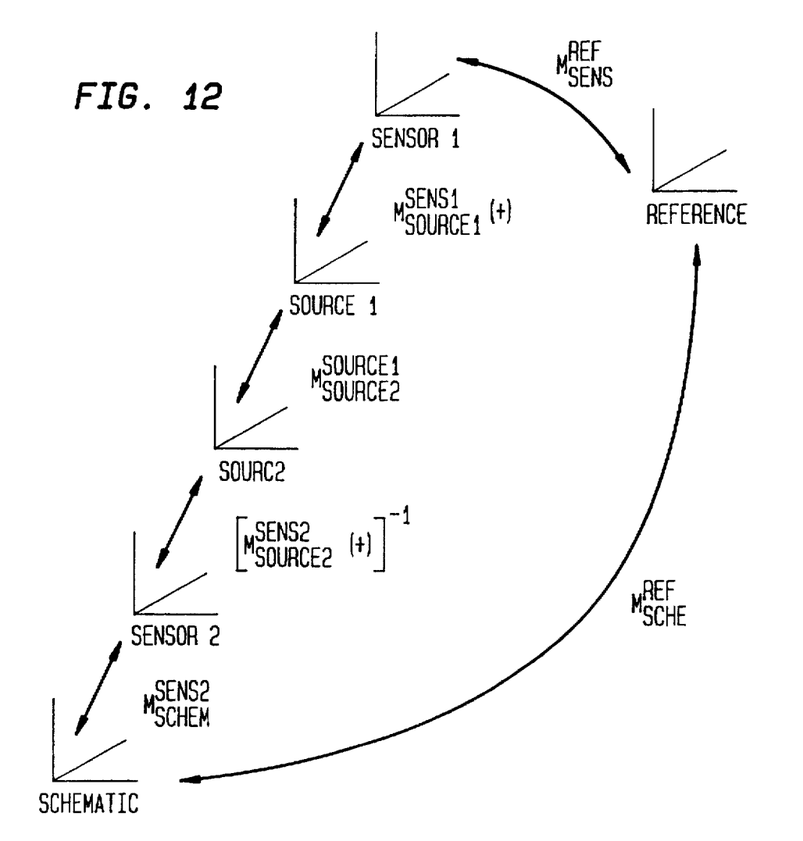
FIG. 12 is a pictorial representation of the coordinate system transformations utilized by the computer unit 12 of FIG. 2 to determine the position and orientation of a view point reference with respect to a schematic representation of the displayed objects in accordance with the fourth embodiment of the present invention.

In the system of FIG. 11, the transformation $M_{schem}^{ref}$ characterizing the position and orientation of the view point reference 28 with respect to the schematic representation 24 may be broken down into five parts as shown in FIG. 12. The first part, $M_{sens1}^{ref}$, is a transformation that represents the correspondence between the coordinate system of the view point reference 28 and the coordinate system of the sensor 22, and thus represents the fixed position and orientation of the view point reference 28 with respect to the sensor 22. The second part, $M_{source1}^{sens1}(t)$, is a transformation that represents the correspondence between the coordinate system of the first sensor 22 and the coordinate system of the first source 30, and thus represents the relative position and orientation of the first sensor 22 with respect to the first source 30 that is output by the first coordinate sensing system over time. The third part, $M_{source2}^{source\ 1}$, is a transformation that represents the correspondence between the coordinate system of the first source 30 to the coordinate system of the second source 70, and thus represents the fixed position and orientation of the first source 30 with respect to the second source 70. The fourth part, $[M_{source2}^{sens2}(t)]^{-1}$, is the inverse of a transformation that represents the correspondence between the coordinate system of the second sensor 72 and the coordinate system of the second source 70, and thus represents the relative position and orientation of the second sensor 72 with respect to the second source 70 output by the second coordinate sensing system over time. And the fifth part, $M_{schem}^{sens2}$, is a transformation that represents the correspondence between the coordinate system of the second sensor 72 and the coordinate system of the schematic representation 24, and thus represents the fixed position and orientation of the second sensor 72 with respect to the schematic representation 24. The first, second, third, fourth and fifth parts typically are four by four homogenous transformation matrices having a rotation portion, a translation portion, and a scale portion if needed.

In particular, the first, third and fifth parts are typically determined and stored during calibration of the system, which is discussed in detail below. The view point control routine determines the current position and orientation of the view point reference with respect to the schematic representation 24 by deriving the second part from the output of the first coordinate sensing system, deriving the fourth part from the output of the second coordinate sensing system, and performing a sequence of transformations according to the first, second, third, fourth and fifth parts. The functions of the first and second sensors 22,72 may be integrated into a single coordinate sensing system employing a common source. In this case, the third part $M_{source2}^{source1}$ may be ignored.

The three-dimensional objects displayed by the system may represent a variety of articles in technical and scientific applications. The schematic representation need not replicate the geometric details of the object to be displayed, and may be a scaled representation of the object. For example, for architectural review, the objects may represent a three-dimensional structure. In this case, the corresponding schematic representation 24 may be, for example, a floor plan of the structure. In another example, for a technical design review, the objects may represent a detailed three-dimensional view of a model of, for example, an automobile engine. In this case, the corresponding schematic representation 24 may be a simplified layout of the automobile engine perhaps comprising blue prints of several orthogonal views. And in another example, in genetic and drug research applications, the objects may represent complex molecular structures, for example the DNA structure of a virus. In this case, the schematic representation 24 may be a simplified ball and stick model of the molecular structure. By integrating the coordinate sensing system with the computer unit 12, the view point control program is able to map the position and orientation of the view point with respect to the objects to be displayed to the position and orientation of the view point reference 28 relative to the schematic representation 24, thus providing a user-friendly and intuitively straightforward means for navigating through these detailed scenes.

Moreover, the schematic representation 24 of the object may be generated by the computer unit 12 and displayed on a screen. Thus, the surface 36 of the table 34 of the first embodiment and the surface 54 of the table of the second and third embodiments may include a screen for displaying the computer generated schematic representation 24. The level of detail of the schematic representation 24 generated by the computer unit 12 may be varied at the user's control or automatically depending upon the position and/or orientation of the view point reference 28. For example, in the case that the schematic representation 24 is a floor plan of a building, upon positioning the view point reference 28 inside a room of the building, the computer unit 12 may refresh the screen with a larger scale schematic representation of the room and display more details of objects inside the room.

In another aspect of the present invention, in order for the view point control program as described above to function properly, it is necessary that the system be calibrated. Calibration is accomplished in two ordered steps:

1] view point reference-sensor calibration; and
2] source-schematic calibration.

The view point reference-sensor calibration determines and stores the transformation representing the correspondence between the coordinate system of the view point reference 28 and the coordinate system of the sensor 22 within the housing 26, denoted as $M_{sens}^{ref}$ in FIGS. 7 and 10 and $M_{sens1}^{ref}$ in FIG. 12. Importantly, this routine is independent of the schematic representation 24. The transformation between coordinate systems of the view point reference and sensor includes two parts: a rotational portion and a translational portion. The rotational and translational portions may be evaluated in many different ways, for example, by direct measurement. However, these methods suffer from the limitation that they are difficult to implement and error prone.

Figure 13A:
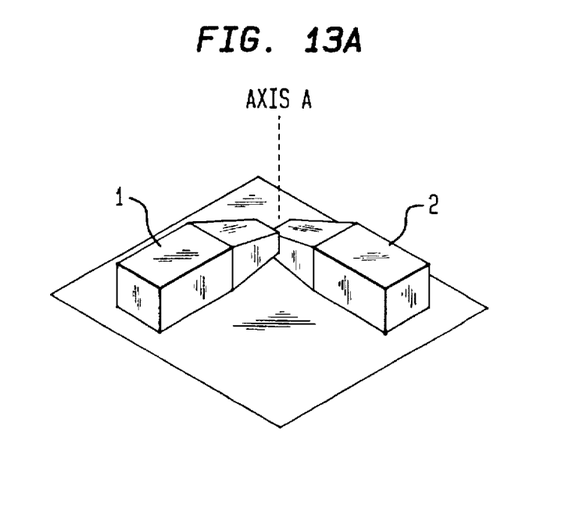
FIGS. 13(a) and (b) is a pictorial representation of a four configuration view point reference-source calibration method in accordance with the present invention.
Figure 13B:
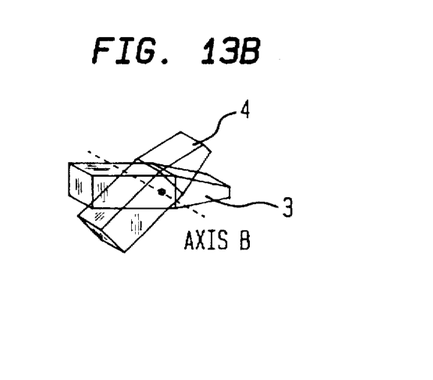

According to the present invention, the view point reference-sensor calibration routine requires the user to register four configurations (position and orientation) of the housing 26. In the preferred embodiment, as shown in FIGS. 13(a) and (b), the user registers a first configuration, rotates the housing 26 about a rotational axis A that passes through a pivot point whose position relative to the view point reference is known, and registers a second configuration. In the preferred embodiment, the pivot point lies at the view point reference. Subsequently, the user registers a third configuration, rotates the housing 26 about a rotational axis B that ideally is orthogonal to axis A and passes through the same pivot point, and registers a fourth configuration. Importantly, the pivot point and axes A and B have a known relation to the origin and axes, respectively, of the view point reference coordinate system 42 as illustrated in FIG. 6. For example, the pivot point may correspond to the origin, and axes A and B correspond to the vertical axis and one of the horizontal axes, respectively.

Figure 14:
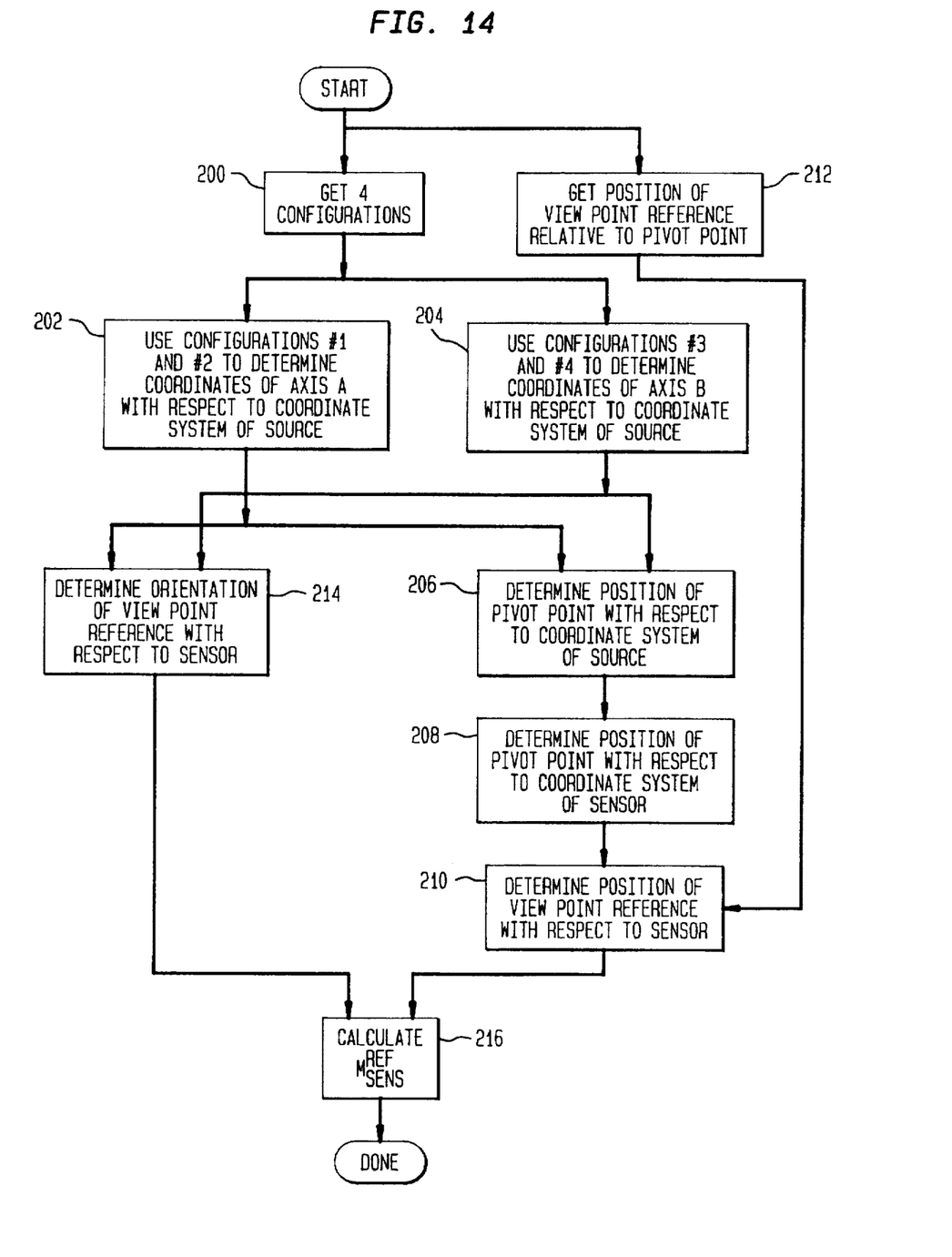
FIG. 14 is a flow chart depicting the four configuration view point reference-source calibration method in accordance with the present invention.

Registering each of the four configurations may be accomplished by user input, such as a predetermined key stroke or mouse click. The computer unit 12 stores the output of the coordinate sensing system at each configuration for processing as illustrated in FIG. 14. In step 200, the computer unit 12 retrieves the 4 configurations from memory. The computer unit 12 in step 202 utilizes the first and second configurations to establish axis A in the source coordinate system. In step 204, the computer unit 12 utilizes the third and fourth configurations to establish axis B in the source coordinate system. Steps 202 and 204 may be done in parallel as shown in FIG. 14 or sequentially. The computer unit 12 in step 206 utilizes the coordinates of axis A and B in the source coordinate system to determine the position of the pivot point in the source coordinate system. In step 208, the computer unit 12 then may utilize one of the four configurations and the position of the pivot point in the source coordinate system calculated in step 206 to determine the position of the pivot point in the sensor coordinate system. Then in step 210, the computer unit 12 utilizes the predetermined position of the view point relative to the pivot point retrieved from memory in step 212 and the position of the pivot point in the sensor coordinate system in step 208 to determine the position of the view point reference with respect to the sensor.

In addition, the computer unit 12 in step 214 utilizes the coordinates of the axes A and B determined in steps 202 and 204 to establish the orientation of the view point reference with respect to the sensor. Finally, in step 216, the computer unit 12 calculates the matrix transformation $M_{sens}^{ref}$ according to the position and orientation of the view point reference with respect to the sensor determined in steps 210 and 214.

In the ideal case, where axis B is orthogonal to axis A and passes through the pivot point, the position of the pivot point in the source coordinate system may be determined in step 206 as the intersection of axis A and axis B in the source coordinate system. Furthermore, in step 214 the orientation of the view point reference with respect to the sensor may be set to an axis orthogonal to axes A and B.

Figure 15:
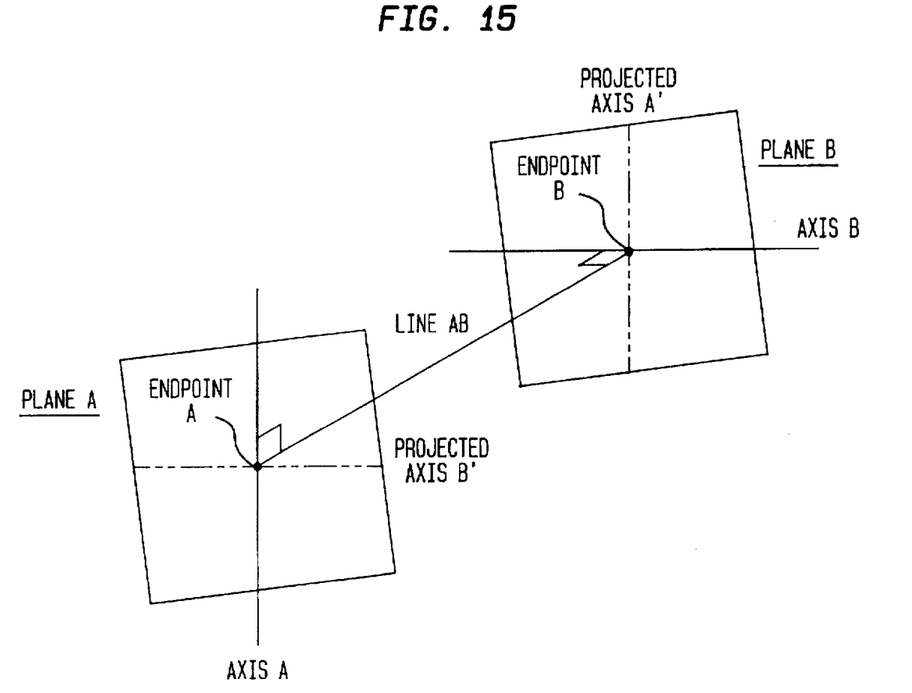
FIG. 15 is a pictorial representation of a method to determine a pivot point between two axes used in the view point reference-sensor calibration routine of FIG. 10.

However, as depicted in FIG. 15, the axes A and B typically do not intersect and may not be exactly orthogonal. In this case, the computer unit 12 may establish a line AB in the source coordinate system perpendicular to both axes A and B, and subsequently establish a third axis in the source coordinate system perpendicular to line AB and one of the axes A and B.

In this case, the position of the pivot point with respect to the source may be determined by the computer unit 12 in step 206 as follows. The computer unit 12 first established two planes A and B in the sensor coordinate system that are perpendicular to the Line AB, wherein axis A lies in plane A and axis B lies in plane B. The computer unit 12 then projects axis A onto plane B to form a first projected axis A' and projects axis B onto plane A to form a second projected axis B'. The endpoints of Line AB are then determined. Endpoint A of line AB is the intersection of axis A with second projected axis B'. Endpoint B of line AB is the intersection of axis B with the first projected axis A'. The computer unit 12 then establishes the position of the pivot point as a weighted position on the Line AB according to the equation:

---
Position of Pivot Point =
 [ ((Axis A weight) * (position of Endpoint A)) +
  ((Axis B weight) * (position of Endpoint B)) ]
--- wherein (Axis A weight)+(Axis B weight)=1 and each weight is positive or zero.

The axis weights are chosen according to the measurement confidence in each rotation, i.e. the first rotation is defined by first and second configurations and the second rotation is defined by the third and fourth configurations. For example, with respect to the registration of the four configurations described above, because the first rotation is more stable than the second rotation, the vertical axis weight may be set to one and the horizontal axis weight to zero.

In this case, in step 214 the orientation of the view point reference with respect to the sensor may be set to an axis orthogonal to axis A and the second projected axis B' or set to an axis orthogonal to axis B and the first projected axis A'.

An example of the four configuration view point reference-sensor calibration routine is shown in FIGS. 13(a) and (b). The user first places the housing 26 of FIG. 5 on a planar surface and registers the first configuration as illustrated in FIG. 13(a). Then, the user rotates the housing 26 clockwise or counter-clockwise around a vertical rotational axis passing through the view point reference 28 and registers the second configuration. Subsequently, as shown in FIG. 13(b), the user registers the third configuration, rotates the housing 26 around a horizontal rotational axis orthogonal to the vertical axis, and registers the fourth configuration.

In some applications, it may be preferable to define the origin and axes of the view point reference coordinate system to be offset and rotated with respect to the pivot point and corresponding axes. In this case, the rotation and translation portions of the transformation calculated in step 216 of FIG. 14 as discussed above are adjusted accordingly.

Upon completion of the sensor-view point reference calibration, the source-schematic calibration is performed. In the first and second embodiments, the source-schematic calibration determines and stores the transformation $M_{schem}^{source}$ of FIG. 6. This routine is dependent upon the schematic representation 24, and thus must be performed for each schematic representation 24. Moreover, when the schematic representation 24 is capable of rotation/displacement, for instance as described above in the second embodiment, the schematic representation 24 must remain fixed in position and orientation during the source-schematic calibration routine. There are several techniques to perform this calibration. Two proven routines are presented below.

The first is a view matching method. In this routine, the user registers the housing 26 in a predetermined configuration (position and orientation) with respect to the schematic representation 24. In this case, the forward axis of the view point reference coordinate system is equated to the display "in" axis, the vertical axis of the view point reference coordinate system is equated to the display "up" axis, and the position of the view point reference is equated to the position of the display's view point. A scale factor portion of the transformation is recorded that relates the physical dimensions of the schematic representation 24 to the dimensions of the objects as represented by the graphics data.

The second source-schematic calibration routine is a three-point method. The user registers the position of the view point reference 28 at three predetermined points with respect to the schematic representation 24. It is important to note that there are no constraints on the orientation of the view point reference 28 of the housing 26 with respect to the schematic representation 24 at each of the three predetermined points. In the preferred embodiment, the user places the view point reference 28 at a first predetermined point and registers the first position. The user then places the view point reference at a second predetermined point and registers the second position. The user then places the view point reference at a third predetermined point and registers the third position. The three predetermined points lie in a predetermined plane P. It may not be required that the third position precisely match the third predetermined point. In this case, the third predetermined point must lie on the plane P and have the same predetermined sense (clockwise or counterclockwise) with respect to the first and second points.

Figure 16:
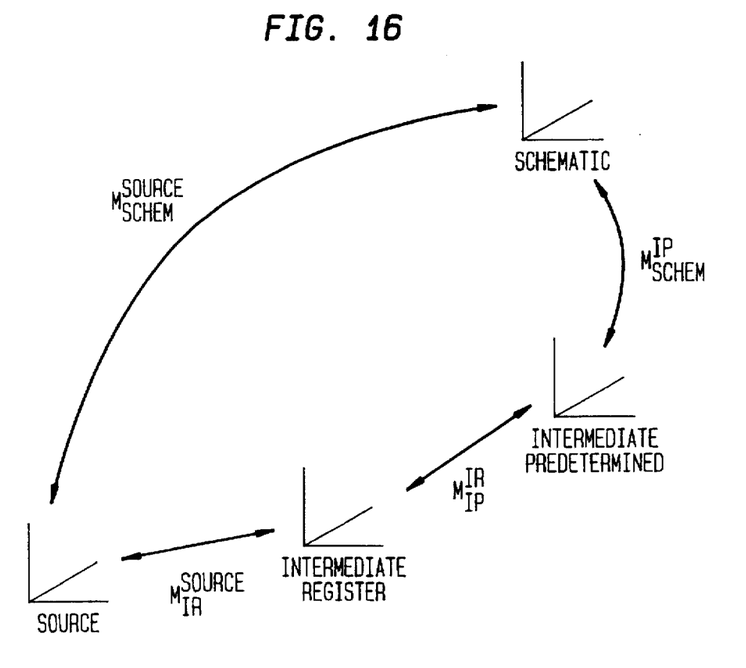
FIG. 16 is a pictorial representation of the coordinate system transformations utilized by the computer unit 12 of FIG. 2 to perform the source-schematic calibration routine in accordance with the present invention.
Figure 17:
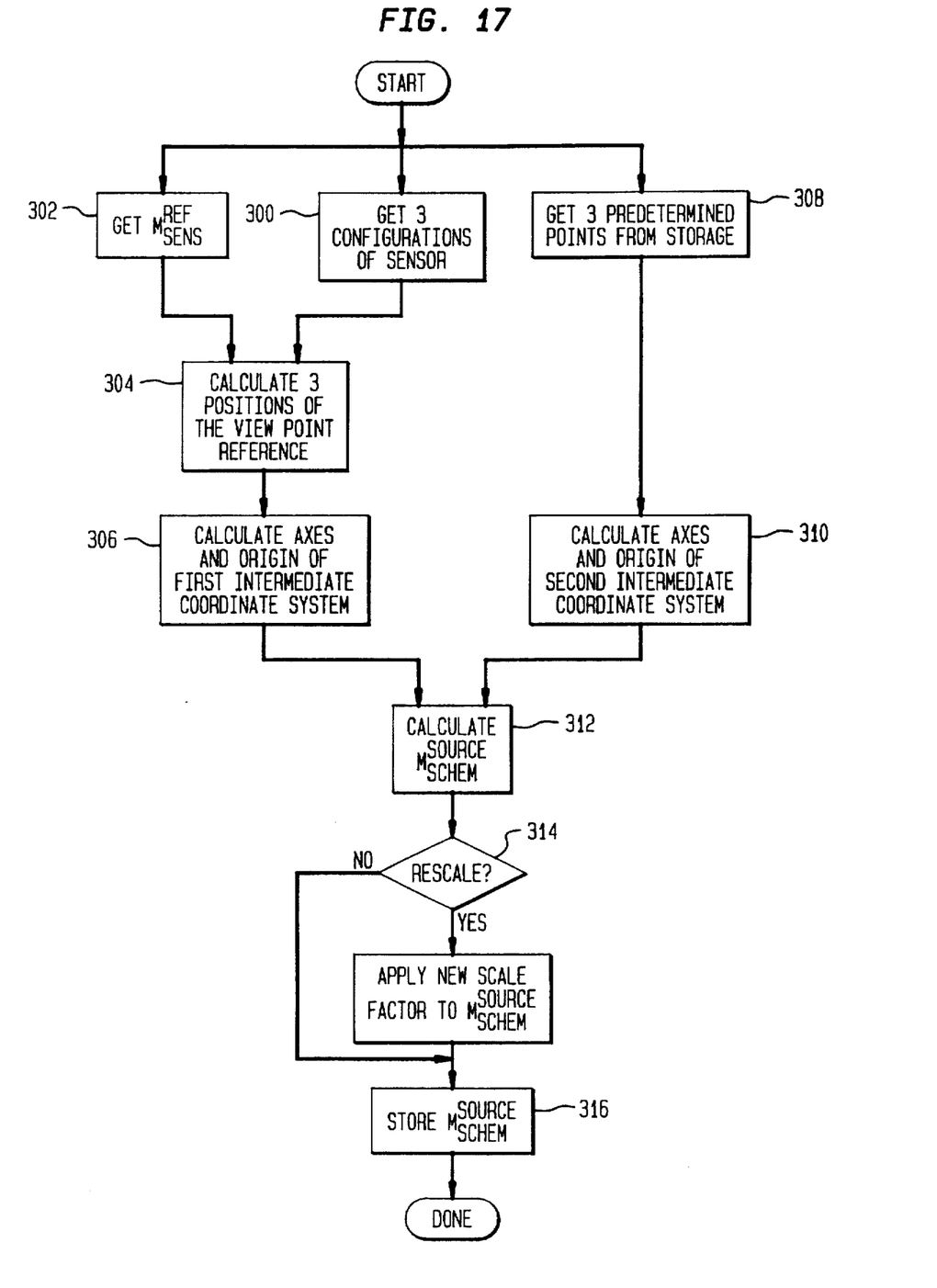
FIG. 17 is a flow chart depicting the three position source-schematic calibration method in accordance with the present invention.

From the output of the coordinate sensing system at each of the three registered positions, the computer unit 12 determines the transformation $M_{schem}^{source}$ as shown in FIGS. 16 and 17. In step 300 and 302, respectively, the computer unit 12 retrieves from memory the three configurations of the sensor and the matrix transformation $M_{sens}^{ref}$. In step 304, utilizing the three configurations and the transformation $M_{sens}^{ref}$, the computer unit 12 calculates the three positions of the view point reference in the source coordinate system. In step 306, the computer unit 12 utilizes the three positions of the view point reference in the source coordinate system to establish the origin and axes of a first intermediate coordinate system. The first position establishes the origin of the first intermediate coordinate system. The vector that joins the first position to the second position defines a first axis of the first intermediate coordinate system. An axis normal to the first axis and a vector that joins the first position to the third position is chosen as a second axis of the first intermediate coordinate system, and an axis orthogonal to the first and second axes is chosen as a third axis of the first intermediate coordinate system.

In addition, in step 308 the computer unit 12 retrieves the three predetermined points from memory, and in step 310 utilizes the three predetermined points to establish the origin and axes of a second intermediate coordinate system. The first predetermined point establishes the origin of the second intermediate coordinate system. The vector that joins the first predetermined point to the second predetermined point defines a first axis of the second intermediate coordinate system. An axis normal to the plane P is chosen as a second axis of the intermediate predetermined coordinate system, and an axis orthogonal to the first and second axes is chosen as a third axis of the second intermediate coordinate system.

The computer unit 12 in step 312 then computes the transformation $M_{schem}^{source}$ as a sequence of transformations: a first transformation $M_{IR}^{source}$ between the first intermediate coordinate system and the coordinate system of the source 30 according to the origin and corresponding axes of the first intermediate coordinate system, a second transformation $M_{schem}^{IP}$ between the second intermediate coordinate system and the coordinate system of the schematic representation 24 according to the origin and corresponding axes of the second intermediate coordinate system, and a third transformation $M_{IP}^{IR}$ between the first and second intermediate coordinate systems. The third transformation $M_{IP}^{IR}$ typically includes only a scale factor portion that represents the scale of the coordinate system of the schematic representation 24 with respect to the scale of the displayed object. The scale factor may be determined by dividing the distance between the first and second registered positions with the distance between the first and second predetermined points in the model of the displayed object.

In the alternative, the scale factor may be measured and supplied by the user. To incorporate this feature, in step 314, the user may be queried the calibration should be rescaled (i.e., the scale factor supplied externally). If the user answers no, flow continues to step 316 where the transformation $M_{schem}^{source}$ is stored. However, if in step 314 the user answers in the affirmative, the computer unit 12 applies the new scale factor to the transformation $M_{schem}^{source}$ and flow continues to step 316 to store the transformation $M_{schem}^{source}$.

In the third embodiment as illustrated in FIGS. 9 and 10, the transformation $M_{schem}^{source}$ includes three parts: $M_{encoder}^{source}$, $M_{shaft}^{encoder}(t)$, and $M_{schem}^{shaft}$. To perform the source-schematic calibration for the system of the third embodiment, the user determines and stores the transformation $M_{schem}^{shaft}$, for example, by direct measurement. The user also holds the encoder 64 at a predetermined position relative to the shaft 62, which corresponds to a prescribed $M_{shaft}^{encoder}(t)$. Finally, the user follows one of the source-schematic calibration routines described above to determine the transformation $M_{encoder}^{source}$ from the calculated transformation $M_{schem}^{source}$.

In the fourth embodiment as illustrated in FIGS. 11 and 12, the transformation $M_{schem}^{source1}$ includes three parts: $M_{source2}^{source1}$, $[M_{source2}^{sens2}(t)]^{-1}$ and $M_{schem}^{sens2}$. To perform the source-schematic calibration of the system of the fourth embodiment, while holding the schematic representation 24 and second sensor 72 at a predetermined position and orientation relative to the second source 70, which corresponds to a prescribed $[M_{source2}^{sens2}(t)]^{-1}$, the user first follows the four configuration view point reference-sensor calibration routine described above to determine the transformation $M_{schem}^{sens2}$. While holding the schematic representation 24 fixed, the user then follows the three point source-schematic calibration routine described above to determine the transformation $M_{source2}^{source1}$ from the calculated transformation $M_{schem}^{source1}$. If the first and second coordinate systems employ a common source, the source-schematic calibration routine only requires that the user, while holding the schematic representation 24 and second sensor 72 at a predetermined position and orientation relative to the second source 70, follow the four configuration view point reference-sensor calibration routine described above to determine the transformation $M_{schem}^{sens2}$.

While the four configuration view point reference-sensor calibration and three point source-schematic calibration procedures require that the user register only four and three configurations, respectively, the invention is not limited in this respect. It should be noted that the accuracy of these calibration techniques may be improved by registering additional configurations and employing data filtering techniques.

Although the invention has been shown and described with respect to the particular embodiments thereof, it should be understood by those skilled in the art that the foregoing and various other changes, omissions, and additions in the form and detail thereof may be made without departing from the spirit and scope of the invention.

We claim:

1. In a system for processing and displaying graphics data representing at least one three-dimensional object according to a view point CHARACTERIZED in that the system includes means for determining position and orientation of a view point reference with respect to a schematic representation of said at least one three-dimensional object, wherein said schematic representation is fixed in a tangible medium, an apparatus for controlling said view point comprising:

a first view point controller for controlling said view point according to the determined position and orientation of said view point reference with respect to said schematic representation; and a display processor for generating pixel data representing a two-dimensional rendering of said at least one three-dimensional object according to said graphics data and said view point, wherein said two-dimensional rendering is different from said schematic representation, and wherein said pixel data generated by said display processor is output for display on a display device.

2. The apparatus of claim 1, wherein said means for determining position and orientation of said view point reference with respect to said schematic representation comprises a sensor packaged in a housing suitable for being held in one hand, wherein said housing comprises said view point reference, wherein said sensor has a fixed position and orientation with respect to said view point reference, and wherein said view point is varied by moving said housing and sensor with respect to said schematic representation.

3. The apparatus of claim 2, wherein said housing and sensor are moved with respect to said schematic representation by hand motion.

4. The apparatus of claim 2, wherein said housing comprises a hand-held miniature toy camera, and said view point reference lies on an imaginary lens of the miniature toy camera.

5. The apparatus of claim 1, wherein said means for determining position and orientation of said view point reference with respect to said schematic representation comprises a sensor, and said view point reference corresponds to said sensor.

6. The apparatus of claim 1, wherein said schematic representation is displayed on a screen.

7. The apparatus of claim 1, wherein said three-dimensional object is a structure and said schematic representation of said three-dimensional object is a floor plan of said structure.

8. The apparatus of claim 1, wherein said schematic representation is a layout of said three-dimensional object.

9. The apparatus of claim 1, wherein said three-dimensional object represents a molecular structure and said schematic representation is a ball and stick model of said molecular structure.

10. The apparatus of claim 1, wherein said means for determining position and orientation of said view point reference with respect to said schematic representation comprises:

a source having a fixed position and orientation with respect to said schematic representation, a sensor that outputs a signal representing the position and orientation of said sensor with respect to said source, said sensor having a fixed position and orientation with respect to said view point reference; and a position and orientation translator that determines position and orientation of said view point reference with respect to said schematic representation according to said signal output by the sensor, according to said fixed position and orientation of the source with respect to said schematic representation, and according to said fixed position and orientation of the sensor with respect to the view point reference.

11. The apparatus of claim 10, wherein said means for determining position and orientation of said view point reference with respect to said schematic representation utilizes electromagnetics between said sensor and said source to determine position and orientation of said view point reference with respect to said schematic representation.

12. The apparatus of claim 10, wherein said means for determining position and orientation of said view point reference with respect to said schematic representation utilizes electrostatics between said sensor and said source to determine position and orientation of said view point reference with respect to said schematic representation.

13. The apparatus of claim 1, wherein said means for determining position and orientation of said view point reference with respect to said schematic representation transmits signals between a source and a sensor to determine the position and orientation of said view point reference with respect to said schematic representation.

14. The apparatus of claim 13, wherein said signals are optical signals.

15. The apparatus of claim 13, wherein said signals are infrared signals.

16. The apparatus of claim 13, wherein said signals are ultrasound signals.

17. The apparatus of claim 1, wherein said schematic representation is capable of displacement and/or rotation.

18. The apparatus of claim 17, wherein said means for determining position and orientation of said view point reference with respect to said schematic representation comprises:

a source having a fixed position and orientation with respect to said schematic representation, a first sensor that outputs a signal representing the position and orientation of said first sensor with respect to said source, said first sensor having a fixed position and orientation with respect to said view point reference; and means for determining displacement and/or rotation of said schematic representation with respect to said source; and a position and orientation translator that determines position and orientation of said view point reference with respect to said schematic representation according to said signal output by the first sensor, according to the determined displacement and/or rotation of said schematic representation with respect to said source, according to said fixed position and orientation of the source with respect to said schematic representation, and according to said fixed position and orientation of the first sensor with respect to the view point reference.

19. The apparatus of claim 18, wherein said means for determining displacement and/or rotation of said schematic representation with respect to said source comprises an optical encoder.

20. The apparatus of claim 18, wherein said means for determining displacement and/or rotation of said schematic representation with respect to said source comprises a second sensor affixed to said schematic representation.

21. The apparatus of claim 1, further comprising:

an input device for inputting user commands;

a second view point controller for controlling said view point according to said user commands input by said input device; and switching means for activating one of said first view point controller and said second view point controller.

22. The apparatus of claim 21, wherein said second view point controller is activated to set an initial view point and said first view point controller is subsequently activated to update said initial view point.

23. The apparatus of claim 21, wherein said input device is a pointing device.

24. The apparatus of claim 21, wherein said input device is a keyboard.

* * * * *